United States Patent [19]

Kovac et al.

[11] 4,107,063

[45] Aug. 15, 1978

[54] WATER BASED SELECTABLE CHARGE MAGNETIC INKS

[75] Inventors: Zlata Kovac, Somers; Carlos Juan Sambucetti, Groton-on-Hudson, both of N.Y.

[73] Assignee: International Business Machines Corporation, Armonk, N.Y.

[21] Appl. No.: 773,578

[22] Filed: Mar. 2, 1977

[51] Int. Cl.² .................. H01F 1/28; C09D 11/00
[52] U.S. Cl. ................................................ 252/62.52
[58] Field of Search ............... 252/62.51, 62.52, 62.53, 252/62.54

[56] References Cited

U.S. PATENT DOCUMENTS

| | | | |
|---|---|---|---|
| 3,054,751 | 9/1962 | Blake | 252/62.52 |
| 3,247,117 | 4/1966 | Shoemaker et al. | 252/62.52 |
| 3,294,686 | 12/1966 | Ayers | 252/62.53 |
| 3,498,748 | 3/1970 | Greiner | 423/634 |
| 3,531,413 | 9/1970 | Rosensweig | 252/62.62 |
| 3,764,540 | 10/1973 | Khalafalla | 252/62.55 |
| 3,953,218 | 4/1976 | Pollard | 106/19 |
| 3,990,981 | 11/1976 | Kovac et al. | 252/62.54 |

FOREIGN PATENT DOCUMENTS 797,335  7/1958  United Kingdom ................. 252/62.52

OTHER PUBLICATIONS

Rosensweig, International Science and Technology, Jul. 1966, pp. 48–56.

*Primary Examiner*—F.C. Edmundson
*Attorney, Agent, or Firm*—Alvin J. Riddles

[57] ABSTRACT

Water based magnetic colloidal fluids, useable as inks, when prepared by coating chemically precipitated magnetite ($Fe_3O_4$) with an adsorption site providing coating agent including certain organic anions, such as sulfates, sulfonates or amino carboxilates, and then dispersing the coated product with non-ionic, anionic or cationic surfactants may exhibit selectably cationic, anionic or non-ionic charge responsiveness.

37 Claims, No Drawings

WATER BASED SELECTABLE CHARGE MAGNETIC INKS

BACKGROUND OF THE INVENTION

Magnetic colloidal fluids are essentially made of a solid magnetic material throughly dispersed in a liquid carrier. The magnetic material, usually magnetite ($Fe_3O_4$) in extremely divided form is submicron in particle size produced by chemical precipitation, and the particles are subsequently coated with a layer of a surfactant retaining material, the coated particles are then permanently suspended in a carrier vehicle such as water mixed with a desired cationic or non-ionic surfactant. The resulting mixture is a colloidal magnetic fluid having several uses one of which is as a magnetic ink. A dispersing agent is usually included in the colloidal magnetic fluid formulation to prevent aggregation of the magnetic particles which could otherwise lead to flocculation and separation of the particles from the fluid.

In the development of the art of such magnetic colloidal fluids a limitation has been encountered in that the properties of the surfactant retaining coating which is usually a fatty acid such as oleate operates to limit flexibility in the properties of the surfactant so that particles receiving a certain coating are then useable only to produce a fluid with a certain charge characteristic.

Therefore, it is a general object of this invention to provide a technique of coating magnetic particles so that the properties of a resulting colloidal magnetic fluid containing them can be changed, by changing the net electrical charge applied to the magnetic particles.

Another object of this invention is to provide an aqueous based magnetic ink, by dispersing the so-coated $Fe_3O_4$ into exclusively non-ionic surfactants, giving a non-ionic ink, in which particles have no net electrical charge.

A further object of this invention is to form a magnetic ink in which the so coated $Fe_3O_4$ is dispersed in an anionic surfactant yielding an anionic ink, in which the particles have a net negative charge.

Another object is to form a magnetic ink by dispersing the so-coated $Fe_3O_4$ in a mixture of cationic and non-anionic surfactants.

DETAILED DESCRIPTION OF THE INVENTION

In accordance with the present invention, finely divided magnetic particles are synthesized by chemical means and rendered dispersible into a colloidal water based vehicle system.

One general process for chemical synthesization involves forming separate aqueous solutions of ferrous chloride and ferric chloride. The solutions are mixed to maintain a molar ratio of $Fe^{+3}/Fe^{+2}$ slightly under 2.0. Magnetite ($Fe_3O_4$) can be formed by chemical precipitation of the ferrous/ferric mixture with a base such as ammonium hydroxide. In order to form a high rate of magnetite nucleation with a base such as ammonium hydroxide, growth temperatures of 5° C to 30° C at a pH of about 9.5 is used.

The $Fe_3O_4$ particles are preferably 70 to 200Å in diameter and are, in accordance with the invention, precoated with an adsorption site providing coating agent that serves the function of providing a coating on the particles that in turn is susceptible to combination with a selectable charge directing surfactant. Such an adsorption site providing coating may be an organic anion such as a sulfate, for example, sodium lauryl sulfate, it may be a sulfonate, such as sodium alkyl polyether sulfonate or it may be amino carboxilate, for example, N-alkyl mono or disodium amino propionate.

The adsorption site providing coating agent coats with the object of preventing agglomeration during particle preparation and initial vehicle dispersion and then serves to make possible combination with a surfactant with a selectable charge.

The $Fe_3O_4$ particles, coated in accordance with the invention, are then capable of being used in a colloidal fluid to which can be imparted a selectable charge characteristic by the addition of a suitable surfactant that serves a bridge between the magnetite and the dispersion medium while also directing the electrical charge conditions of the particles.

When the coated $Fe_3O_4$ particles are dispersed with use of a non-ionic surfactant agent the result is a non-ionic colloidal fluid. In this case, the particles do not possess a net electrical charge, but are maintained in stable dispersion by the effect of entropic repulsion forces provided by the non-ionic surfactant. The dispersion is also enhanced by a large hydration layer where the dispersion medium or vehicle is water.

Further, in accordance with the invention, precoated $Fe_3O_4$ particles may be dispersed into fluids by using a combination of non-ionic surfactants and + or − charge directing agents. The appropriate + or − charge directing agents may now yield positive or negatively charged particles. The anionic (−) or cationic (+) charge directing agents operate to impart a relatively large charge on the magnetic particles, for example, producing a zeta potential of −30 to 100 mV or +30 to +100 mV respectively. This increases the colloidal fluid stability by electrostatic repulsion.

One of the applications of colloidal magnetic fluids is for magnetic ink jet printing where a stream of ink is supplied under pressure and periodically pulsed to produce droplets which impinge upon a sheet of moving paper. The droplets of magnetic ink emerging from a nozzle have to be of uniform size, uniformly spaced from each other and emerging at a rate which can be of the order of $10^4$ to $10^5$ drops per second. Water is usually used as the vehicle because of its favorable viscosity and volatility properties.

In order to prepare an aqueous based magnetic printing ink, it is necessary to have available magnetic particles of small size characterized by high magnetic moment. Using magnetite ($Fe_3O_4$) as an example, the particle size range should be about 50 to b 300Å, preferably about 75 to 200Å. Magnetic moment for aqueous magnetic inks should desirably be within the range of about 65 to 89 emu./gram of dried, magnetic material in air or vacuum with a magnetic moment of preferably about 70 emu/gram at room temperature.

Ferric chloride and ferrous chloride or ferrous sulfate are dissolved in separate bodies of water to form solutions thereof. The solutions are mixed in amounts to obtain the molar ratio $Fe^{+3}/Fe^{+2}$ slightly under the value of 2.0. Magnetite, ($Fe_3O_4$), can be formed by chemical precipitation of the ferrous-ferric mixture with a base, such as ammonium hydroxide. In order to favor a high rate of magnetite nucleation coupled with a slow rate of particle growth, chemical precipitation can be carried out preferably in an ultrasonic bath maintained at about 25° C. The pH of the mixture during chemical precipitation for deposition of magnetite may be maintained between 8.9 and 10.2, with the preferred pH being 9.5.

After precipitation is complete, the adsorption site providing coating agent is applied to the particles. A solution of organic anions such as sodium-lauryl sulfate or N-alkyl mono or disodium amino propionate is added. The coating material should be added very slowly, over a period of 10-45 minutes in order to achieve better distribution around the magnetic particles. The slow addition with agitation of the coating agent provides more uniform coverage of the $Fe_3O_4$ particles. This in turn increases the ink yield since the non-coated $Fe_3O_4$ does not remain suspended and hence is not transformed into ink.

In accordance with the invention the coating of the $Fe_3O_4$ particles not only accomplishes the prevention of agglomeration of the particles as done heretofore in the art but it also provides "adsorption sites" for the attachment of the molecules of the non-ionic surfactant that in turn provides the wettability of the $Fe_3O_4$ by the water medium.

Among the materials found suitable to provide the initial $Fe_3O_4$ coatings are:

organic sulfates of the general formula;

$$R-O-S(=O)(=O)-ONa$$

where $R = C_{12}$ or larger for example, sodium-lauryl sulfate $$CH_3-(CH_2)_{11}-O\cdot SO_3\cdot Na$$

amino carboxilate anions, of the general formula:

$$R-N\begin{pmatrix}CH_2-CH_2-CO\ O^-\ Na^+\\ CH_2-CH_2-CO\ O^-\ Na\end{pmatrix}$$

where $R = C_{12}$ to $C_{18}$ for example, sodium lauryl amino propionate $$C_{12}H_{25}NH-CH_2CH_2COO^--Na^+$$

and others of similar composition.

The coated magnetic particles in aqueous suspension are then heated to about 100° C, to increase the magnetic moment thereof and to cause precipitation of the coated magnetite particles for cleaning. The particles are then rinsed with distilled water to remove $NH_4$ salts. Final separation can be carried out in any conventional manner, such as by use of a centrifuge.

Once the adsorption site coated magnetite particles ($Fe_3O_4$) of the preferred 75 to 200Å size have been obtained or prepared as above, the particles are placed in a colloidal suspension by dispersing with an appropriate charge directed surfactant. The coated particles may be dispersed with only a non-ionic surfactant yielding an ink with no charge; they can be dispersed with non ionic + cationic surfactants yielding a cationic ink with a net positive charge on the particles; or they can be dispersed with the other combination of non-ionic + anionic surfactants yielding an ink in which the particles have a net negative charge.

The charge directing surfactant always has as an essential component a non-ionic component that serves as a wetting agent and is selected to provide a bridge between the lyophobic disperse phase, i.e., magnetite, and the dispersion medium of water.

Other non-ionic surfactants may also be used such as polyoxyethylene. Similarly alkylarylpolyether alcohols or alkylphenol ethers of polyethylene glycol wherein the alkyl chain is $C_8$ to $C_{24}$ and containing from 8 to 15 oxyethylene units can be employed. For example, compounds of the formula below may be used:

$$R-\bigcirc-(OCH_2CH_2)_xOH$$

where R is an alkyl chain and x designates the number of oxyethylene units and $$\bigcirc$$

is a benzene ring.

The octyl or nonyl compounds wherein $x$ is 9 or 10, are preferred due to their excellent water solubility and reasonable viscosity, for example, nonyl phenol or tertiary octyl phenol polyoxyethylenated with 9 to 10 moles of ethylene oxide.

FLUIDS WITH NON-CHARGED PARTICLES

The amount and type of non-ionic surfactant agent is selected to provide an interfacial tension between magnetite particles and water of about 24 to 36 dynes/cm, preferably about 30 to 34 dynes per cm. Generally, about 5 to 10 weight percent based on magnetite of non-ionic surfactant will be sufficient, preferably about 7%.

Water based inks prepared only with a non-ionic surfactant maintain their stability due to entropic repulsion forces and to the large hydration layer. They are isotropic and free of magnetic remanence.

FLUIDS WITH POSITIVE CHARGE PARTICLES

In water based inks employing the non-ionic surfactant + cationic agent combination, the type and amount of cationic surface active agent is selected to impart a zeta potential of about +30 to +100 millivolts, thus providing particle stability due to electrostatic repulsion between the positive charged particles.

Usable cationic agents are the quaternary ammonium compounds, of the general formula, $$\left[R-\underset{\underset{R'}{|}}{\overset{\overset{CH_3}{|}}{N}}-CH_3\right]^+ X^-$$

where

R and R' are the same or different branched or chain Alkyl or Benzyl between 8 and 24 carbon atoms, preferably $C_{12}$ to $C_{18}$, and $X^-$ is an anion such as chloride.

The concentration of the cationic agent used is of the order of 2 to 10% by weight, based on the magnetite, which in turn is preferably 4 to 8% by weight/100 grs. of $Fe_3O_4$. A preferred type of cationic agent used is one in which the $(CH_3)$ groups of the general formula above, are replaced by ethoxylated or methoxylated groups, which increase the compatibility of the agent with water, for example, the ethoxylated ammonium compound of the formula:

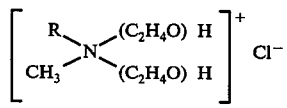

where R is one of chains $C_{12}$ to $C_{18}$.

FLUIDS WITH NEGATIVELY CHARGED PARTICLES

In the water based inks prepared by dispersing the coated $Fe_3O_4$ with a combination of non-ionic surfactants + anionic agent, the anionic agent used can be selected from one of the groups of polyether sulfonates or long chain organic carboxylates, for example, sodium alkyl aryl polyether sulfonate:

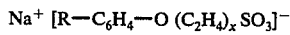

where $R = C_{12}$ to $C_{18}$ or, for example, alkyl beta amino sodium propionate.

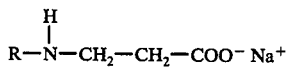

where $R = C_{12}$ to $C_{18}$ where the negative charge on the carboxylic or sulfonic groups provides electrostatic repulsion.

The amount of the anionic agent to be used is of the order of 2 to 12% based on the magnetite, which in turn is preferably 4 to 8 grs for 100 grs of $Fe_3O_4$.

Finally, for all inks, to complete the dispersion and to adjust the viscosity and other properties of the ink, a final addition of a mixture of glycerol and polyetheylene glycol is carried out, in the proportion of 15% by weight of polyethylene glycol 200 and 10% by weight of glycerol, based on amount of $Fe_3O_4$.

EXAMPLES

The following examples illustrate the preparation of magnetic inks, in accordance with the present invention.

EXAMPLE 1

Step A — Coating of $Fe_3O_4$ with an organic sulfate 378 of $FeCl_3$ 6 $H_2O$ and 160 grs $FeCl_2 \cdot 4 H_2O$ are dissolved together in 2 liters of distilled water. In this case it is essential to use $FeCl_2$ instead of $FeSO_4$ in the precipitation of the magnetite because sulfate ions interfere with the coating properties of the organic sulfate. To the mixture, maintained at room temperature and under mechanical and ultrasonic stirring, 500 cc of $NH_4OH$ solution is added. One minute after precipitation, start adding a solution of 16 g of sodium lauryl sulfate dissolved in 250 cc of water. This addition is done very slowly at a rate of about 5 cc/minute.

Once precipitation and $Fe_3O_4$ coating is completed, the beaker containing the coated magnetite is next heated to boiling and then set aside to settle. The excess liquid is decanted and the coated $Fe_3O_4$ is rinsed 6 times with about 2 liters of hot distilled water, removing each time after settling the excess water by decantation. After final wash, the suspension is centrifuged for ½ hour. The product at this stage is typically a wet mass of about 450 grs.

Step B — Making of non-ionic ink

The wet coated magnetite (about 450 grs) is added to a suitable mixing apparatus such as an attritor. Thereafter, a solution of non-ionic surfactant is added thereto. This solution is prepared by first dissolving 30 grs of a polyoxyethylenated nonyl phenol in 100 ml of water. Next, the dispersing agent of 20 grs of glycerol and 26 grs of polyethylene glycol (Mol. weight 200) is added thereto. The attritor is started slowly and then run at full speed for 2 hours. Following 2 hours in the attritor, the mixture is transferred to a beaker and heated in a boiling bath of water for 3 hours, with stirring, after which it is cooled to room temperature and centrifuged for 45 minutes at 3000 rpm. The fluid remaining after decantation is usable as magnetic ink, with the following characteristics:

| Non-ionic (uncharged particles) ink | |
|---|---|
| magnetic moment | 18 to 23 electromagnetic units (emu) |
| weight of ink | 400 to 460 grams |
| viscosity | 8 to 13 centipoises measured at 60 rpm with Brookfield Viscometer |
| surface tension | 29 to 32 dynes/cm |
| pH | 5.5 to 6.5 |
| resistivity | 400 to 500 $\Omega$ cm |

The ink will pass 3 micron filter mesh.

Making a positively charged particle ink

For the preparation of a + charged particle ink known in the art as a cationic ink, $Fe_3O_4$ coated with organic sulfate, is prepared as in Step A.

Step B is also followed with the following exception:

To the $Fe_3O_4$ in the attritor add to the mixture of 30 g of the non-ionic polyoxyethylenated nonyl phenol surfactant, 10 g of a cationic agent, ethoxylated quaternary ammonium, followed by the dispersing agent 20 grs of glycerol and 26 grs of polyethylene glycol M.W. 200. The rest of the procedure is the same as above, resulting in an ink with the following characteristics:

| Cationic ink ($Fe_3O_4$ having a net positive charge) | |
|---|---|
| magnetic moment | 20 to 25 emu/gr |
| viscosity | 10 to 15 cps |
| pH | 5.5 to 6.5 |
| resistivity | 200 to 300 $\Omega$ cm |
| surface tension | 28 to 32 dynes/cm |
| weight of ink | 450 to 500 grs |

Making a negatively charged particle ink

For making negatively charged particle inks, known in the art as anionic inks, the organic sulfate-coated magnetite, prepared in step A is used.

In step B, to the magnetite in the attritor is now added to the surfactant mixture of 30 g of polyoxyethylenated nonyl phenol, an anionic agent, 8 g of disodium amino propionate dissolved in 100 ml of water. The glycerol and ethylene glycol dispersing agent being the same, the proedure as above will provide an ink with the following characteristics:

| Anionic ink (negatively charged $Fe_3O_4$ particles) | |
| --- | --- |
| magnetic moment | 24 to 27 emu/gr |
| viscosity | 20 to 30 cps |
| pH | 4.5 to 5.5 |
| surface tension | 28 to 33 dynes/cm |
| resistivity | 150 to 250 Ω cm |
| amount of ink | 450 to 550 grs |

EXAMPLE 2

Coating of $Fe_3O_4$ with amino carboxylate

Step A — 378 grs of $FeCl_3 \cdot 6 H_2O$ + 160 grs of $FeCl_2 \cdot 4 H_2O$ are dissolved in 2 liters of distilled water. In this case $FeCl_2$ can be replaced by $FeSO_4$ for precipitation of the magnetite. The grade of $FeSO_4$ can be below technical grade such as fertilizer grade. To the mixture, at room temperature, with ultrasonic and mechanical stirring, 500 cc of $NH_4OH$ is added. Soon after precipitation a solution of 26 g of N-alkyl disodium amino propionate is dissolved in 500 cc of water, is added slowly at a rate of 5–10 cc/min. After addition is complete, the suspension is heated to boiling and then set aside to decant. The rest of the washing and separation technique is the same as Example 1, step A.

Making a non charged particle (non-ionic) ink

Step B — The centrifuged, coated $Fe_3O_4$ (about 450 grs) is transferred to attritor to which is added the non ionic surfactant 35 grs of polyoxyethelenated nonyl phenol, and the dispersing agent 20 grs of glycerol + 37 grs of polyethylene glycol 200 and the procedure is the same as above in Example 1, step B.

| Ink properties | |
| --- | --- |
| magnetic moment | 18 to 22 emu/gr |
| viscosity | 8 to 12 cps |
| pH | 5 to 7 |
| resistivity | 300 to 500 Ω cm |
| ink yield | 400 to 450 grs |
| surface tension | 28 to 32 dynes cm |

In the light of the principles set forth above, a cationic ink can be produced by using in addition a cationic agent, 10 grams of an ethyoxlated quaternary ammonium compound to the non ionic surfactant. Similarly an anionic ink can be produced by using an anionic agent, 8 grams of N-alkyl disodium amino propionate to the non-ionic surfactant.

While the invention has been described in detail with reference to specific embodiments thereof, it will be apparent to one skilled in the art that various changes and modifications can be made therein without departing from the spirit and scope thereof.

What is claimed is:

1. A water based magnetic ink comprising in combination magnetite particles having a coating of an adsorption site providing material taken from the group of organic sulfates, sulfonates and amino carboxylates and having chemically attached thereto a non-ionic surfactant taken from the group of polyoxyethylenes, alkylarylpolyether alcohols, and alkylphenolethers, said particles being dispersed in water containing at least one of glycerol and polyethylene glycol.

2. The ink of claim 1 wherein said coating is of sodium lauryl sulfate.

3. The ink of claim 2 wherein said non-ionic surfactant is polyoxyethylated nonyl phenol.

4. The ink of claim 3 including a cationic agent of ethoxylated quaternary ammonia.

5. The ink of claim 3 including an anionic agent of N-alkyl disodium amino propionate.

6. The ink of claim 1 wherein said coating is of N-alkyl disodium amino propionate.

7. The ink of claim 6 wherein said non-ionic surfactant is polyoxyethylated nonyl phenol.

8. The ink of claim 7 including a cationic agent of ethoxylated quaternary ammonia.

9. The ink of claim 7 including an anionic agent of N-alkyl disodium amino propionate.

10. The ink of claim 1 wherein said coating is amino carboxylate.

11. The ink of claim 10 wherein said non-ionic surfactant is polyoxyethylated nonyl phenol.

12. The ink of claim 11 including a cationic agent of ethoxylated quaternary ammonia.

13. The ink of claim 11 including an anionic agent of N-alkyl disodium amino propionate.

14. A magnetic particle charge selectable colloidal magnetic fluid comprising in combination a fluid vehicle of water having dispersed therein a dispersing agent, and coated with an adsorption site providing coating and magnetite particles having at each site a charge determiner chemically attached thereto.

15. The fluid of claim 14 wherein the coated magnetite particles are coated with organic sulfate, sulfonate or amino carboxilate anions.

16. The fluid of claim 11 wherein the charge determiner is a non-ionic surfactant.

17. The fluid of claim 16 wherein the non-ionic surfactant is polyoxyethylene.

18. The fluid of claim 16 wherein the non-ionic surfactant is alkylarylpolyether alcohol.

19. The fluid of claim 16 wherein the non-ionic surfactant is an alkylphenolether of polyethylene glycol of the formula,

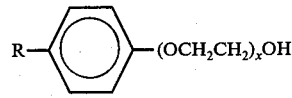

where R is an alkyl chain,

is a benzene ring and $x$ designates the number of oxyethylene units.

20. The fluid of claim 14 wherein the charge determiner is a non-ionic surfactant with an anionic agent.

21. The fluid of claim 20 wherein said anionic agent is a long chain organic carboxylates.

22. The fluid of claim 20 wherein said anionic agent is a polyether sulfonate.

23. The fluid of claim 14 wherein the charge determiner is a non-ionic surfactant with a cationic agent.

24. The fluid of claim 23 wherein said cationic agent is a quaternary ammonium compound of the formula,

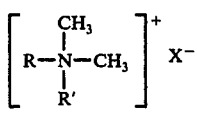

where R and R' are the same or different branched or chain alkyl or benzyl groups between 8 and 24 carbon atoms and $X^-$ is an anion such as a chloride.

25. The fluid of claim 23 where said cationic agent is an ethoxylated ammonium compound of the formula,

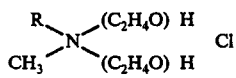

where R is one of chains $C_{12}$ to $C_{18}$.

26. A magnetic particle charge selectable colloidal aqueous magnetic fluid having coated magnetic particles dispersed in a fluid which is characterized by the improvement comprising:
an adsorption site providing coating on said magnetic particles operable to permit attachment of a non-charge directing surfactant.

27. The magnetic fluid of claim 26 wherein said surfactant includes a positive charge directing agent.

28. The magnetic fluid of claim 26 wherein said surfactant includes a negative charge directing agent.

29. A magnetic particle charge selectable colloidal magnetic fluid comprising in combination a fluid vehicle of water containing a dispersion of coated magnetic particles with adsorption sites, each site having a non-electric charge determining surfactant chemically attached thereto.

30. The magnetic fluid of claim 29 wherein said surfactant includes a positive charge directing agent.

31. The magnetic fluid of claim 29 wherein said surfactant includes a negative charge directing agent.

32. The process of making a colloidal magnetic fluid comprising in combination the steps of:
providing magnetic material particles;
coating said particles with an adsorption site providing material;
attaching a non-ionic electrical charge bearing surfactant by chemical means to each particle at each said site; and
dispersing said particles in a fluid.

33. The process of claim 32 including the step of attaching at least one of an anionic or cationic electrical charge bearing agent to each said particle.

34. The process of making a magnetic ink comprising in combination the steps of:
providing magnetic material particles from 50A to 300A diameter in size;
coating said particles with an adsorption side providing material taken from the group of organic sulfates, sulfonates and amino carboxylates,
attaching a non-ionic electrical charge bearing surfactant taken from the group of polyoxyethylenes, alkylarylpolyether alcohols and alkylphenolethers to each particle; and
dispersing said particles in water including a dispersing agent of at least one of glycerol and elthylene glycol.

35. The process of claim 34 including the step of attaching to the non-ionic surfactant on each particle an electric charge bearing agent taken from the group of anionic and cationic agents.

36. The process of claim 35 wherein said anionic agent is disodium amino propionate.

37. The process of claim 36 wherein said cationic agent is ethoxylated quarternary ammonia.

* * * * *